United States Patent
Wu et al.

(10) Patent No.: US 7,184,637 B2
(45) Date of Patent: Feb. 27, 2007

(54) BROADBAND ULTRA-FLATTENED DISPERSION MICRO-STRUCTURED FIBER

(75) Inventors: Tzong-Lin Wu, Kaohsiung (TW); Chia-Hsin Chao, Taichung (TW)

(73) Assignee: National Sun Yat-Sen University, Kaohsiung (TW)

( * ) Notice: Subject to any disclaimer, the term of this patent is extended or adjusted under 35 U.S.C. 154(b) by 0 days.

(21) Appl. No.: 11/151,113

(22) Filed: Jun. 13, 2005

(65) Prior Publication Data
US 2006/0002674 A1    Jan. 5, 2006

(30) Foreign Application Priority Data
Jun. 30, 2004    (TW) ............... 93119657 A

(51) Int. Cl.
*G02B 6/032*    (2006.01)
*G02B 6/00*     (2006.01)
(52) U.S. Cl. ............. 385/125; 385/126; 385/127
(58) Field of Classification Search ........ None
See application file for complete search history.

(56) References Cited

U.S. PATENT DOCUMENTS 6,792,188 B2 * 9/2004 Libori et al. ............ 385/125
6,816,658 B2 * 11/2004 Bayart et al. ............ 385/125
6,856,742 B2 * 2/2005 Broeng et al. ............ 385/125

OTHER PUBLICATIONS

Ferrando, A., et al. "Nearly Zero Ultraflattened Dispersion in Photonic Crystal Fibers." *Optics Letters* (2000) vol. 25, No. 11, pp. 790-792.
Reeves, W.H., et al. "Demonstration of Ultra-Flattened Dispersion in Photonic Crystal Fibers." *Optics Express* (2002) vol. 10, No. 14, pp. 609-613.
Saitoh, K., et al. "Chromatic Dispersion Control in Photonic Crystal Fibers: Application to Ultra-Flattened Dispersion." *Optics Express* (2003) vol. 11, No. 8, pp. 843-852.
Saitoh, K., et al. "Unique Dispersion Properties of Photonic Crystal Fibers." *IEEE* (2003) 1A7.3, pp. 171-175.
Wu, T., et al. "A Novel Ultraflattened Dispersion Photonic Crystal Fiber." *IEEE Photonics Technology Letters* (2005) vol. 17, No. 1, pp. 67-69.
Saitoh, K., et al. "Highly Nonlinear Dispersion-Flattened Photonic Crystal Fibers for Supercontinuum Generation in a Telecommunication Window." *Optics Express* (2004) vol. 12, No. 10, pp. 2027-2032.
Poli, F., et al. "Tailoring of Flattened Dispersion in Highly Nonlinear Photonic Crystal Fibers." *IEEE Photonics Technology Letters* (2004) vol. 16, No. 4, pp. 1065-1067.

* cited by examiner

*Primary Examiner*—Sung Pak
(74) *Attorney, Agent, or Firm*—Ladas and Parry LLP

(57) ABSTRACT

The invention relates to a micro-structured fiber comprising a core region and a cladding region. The cladding region has a plurality of air holes regularly arranged on a plurality of rings, wherein the innermost ring of the fiber defines the core region. The cladding region comprises an inner circumference portion and an outer circumference portion; the inner circumference portion comprises at least one ring, the outer circumference portion comprises at least one ring, wherein the diameter of the air hole on the outer circumference portion is larger than that of the air hole on the inner circumference portion. As a result, the micro-structured fiber of the present invention has the advantages of broader band of nearly zero dispersion, less confinement loss, being easier to design due to less geometrical parameters needed to be optimized, and being easier to fabricate.

7 Claims, 2 Drawing Sheets

BROADBAND ULTRA-FLATTENED DISPERSION MICRO-STRUCTURED FIBER

BACKGROUND OF THE INVENTION

1. Field of the invention

The present invention relates to a micro-structured fiber having an array of micrometer-sized air holes, and more particularly, to a micro-structured fiber having a plurality of air holes with different diameters.

2. Description of the Related Art

Referring to FIG. 1, a cross-sectional view of a conventional micro-structured fiber is shown. The micro-structured fiber 10 is a so-called photonic crystal fiber (PCF). As shown in FIG. 1, the micro-structured fiber 10 comprises a core region 11 and a cladding region 12, wherein the material of the core region 11 is the same as that of the cladding region 12. The cladding region 12 has a plurality of air holes 13 that are approximately circular in shape and are regularly arranged on a plurality of hexagonal rings 14. The innermost ring 14 of the fiber 10 defines the core region 11. All of the air holes 133 have the same diameter d, and the pitches (distances) $\Lambda$ between adjacent air holes, for example, between air holes 131 and 132, are all equal.

In order to achieve the chromatic dispersion related application, such as flattened dispersion, dispersion compensation or shifted dispersion, the value of the diameter d of the air holes 13 and the pitch $\Lambda$ between the air holes 13 should be adjusted. In general, the larger ratio of the diameter d to the pitch $\Lambda$ (d/$\Lambda$) of the air holes 13 represents that the light communication band has a larger normal dispersion value to realize dispersion compensation, whereas the smaller ratio of the diameter d to the pitch $\Lambda$ (d/$\Lambda$) of the air holes 13, such as 0.25, realizes the flattened dispersion. In most cases, the pitch $\Lambda$ is usually about 2.6 µm, and the diameter d is usually about 0.624 µm.

U.S. Pat. Nos. 6,636,677 and 6,718,105 disclose the fibers that achieve a better dispersion compensation by combining the technique of controlling the distribution of the refractive index around the core region and the structure of the micrometer-sized air holes. Additionally, U.S. Pat. Nos. 6,571,045 and 6,445,862 also achieve a better dispersion compensation caused by the effect of different distribution of the refractive index around the core region by controlling the air holes to have a uniform structure period.

Referring to FIG. 2, a relationship between the chromatic dispersion value and the wavelength of a conventional micro-structured fiber of FIG. 1 is shown. As shown in FIG. 2, the conventional micro-structured fiber 10 has a dispersion of ±0.5 ps/km/nm from 1350 nm to 1750 nm wavelength, is which has a bandwidth of 400 nm. It is known that the photonic crystal fiber (PCF) with flattened dispersion has a ratio (d/$\Lambda$) of about 0.25. There are two ways to make the ratio (d/$\Lambda$) become smaller; one is to reduce the diameter d and the other one is to enlarge the pitch $\Lambda$. However, such two ways both will increase the confinement loss, and more than twenty rings of air holes are required in the cladding region 12 to significantly reduce the confinement loss to the standard of conventional fiber. Therefore, such design raises the difficulty in manufacture and the manufacturing cost (see "A. Ferrando, E. Silvestre, J. J. Miret, and P. Andres, "Nearly zero ultraflattened dispersion in photonic crystal fibers," *Opt. Lett.*, vol. 25, pp. 790–792, 2000" and "W. H. Reeves, J. C. Knight, and P. St. J. Russell, "Demonstration of ultra-flattened dispersion in photonic crystal fibers," *Opt. Expr.*, vol. 10, pp. 609–613, 2002").

Recently, a second prior art of a design of photonic crystal fiber (PCF) with four or five rings of different air-hole diameters for each ring was proposed for achieving ultralow ultra-flattened dispersion (see "K. Saitoh and M. Koshiba, "Chromatic dispersion control in photonic crystal fibers: Application to ultra-flattened dispersion," *Opt. Expr.*, vol. 11, pp. 843–852, 2003", "K. Saitoh and M. Koshiba, "Unique Dispersion Properties of Photonic Crystal Fibers," *ICICS-PCM* 2003, pp. 171–175, December 2003" and "F. Poli, A. Cucinotta, S. Selleri, and A. H. Bouk, "Tailoring of Flattened Dispersion in Highly nonlinear Photonic Crystal Fibers," *IEEE Photon. Technol. Lett.*, vol. 16, pp. 1065–1067, April 2004"). This design significantly reduces the ring number of the air holes, but the design procedure becomes complicated due to several geometrical parameters, five (four kinds of air-hole diameters and one pitch) for the four-ring case and six (five kinds of air-hole diameters and one pitch) for the five-ring case, which are needed to be simultaneously optimized to achieve the flattened dispersion behavior of the PCF.

Consequently, there is an existing need for a novel and improved broadband ultra-flattened dispersion micro-structured fiber to solve the above-mentioned problems.

SUMMARY OF THE INVENTION

One objective of the present invention is to improve the shortcomings of high manufacture difficulty and high confinement loss of the conventional micro-structured fiber caused by reducing the diameter of the air holes and enlarging the pitch between the air holes when being designed in the consideration of flattened dispersion. The micro-structured fiber of the present invention has the advantages of broader band of nearly zero dispersion, less confinement loss, being easier to design due to less geometrical parameters needed to be optimized, and being easier to fabricate.

Another objective of the present invention is to provide a micro-structured fiber comprising a core region and a cladding region, wherein the material of the core region is the same as that of the cladding region. The cladding region has a plurality of air holes regularly arranged on a plurality of hexagonal rings, wherein the innermost ring of the fiber defines the core region. The cladding region comprises an inner circumference portion and an outer circumference portion; the inner circumference portion comprises at least one ring, wherein the air holes on each ring of the inner circumference portion have equal diameters and pitches therebetween. The outer circumference portion comprises at least one ring, wherein the air holes on each ring of the outer circumference portion have equal diameters and pitches therebetween. The diameter of the air hole on the outer circumference portion is larger than that of the air hole on the inner circumference portion.

DETAILED DESCRIPTION OF THE INVENTION

Figure 3:
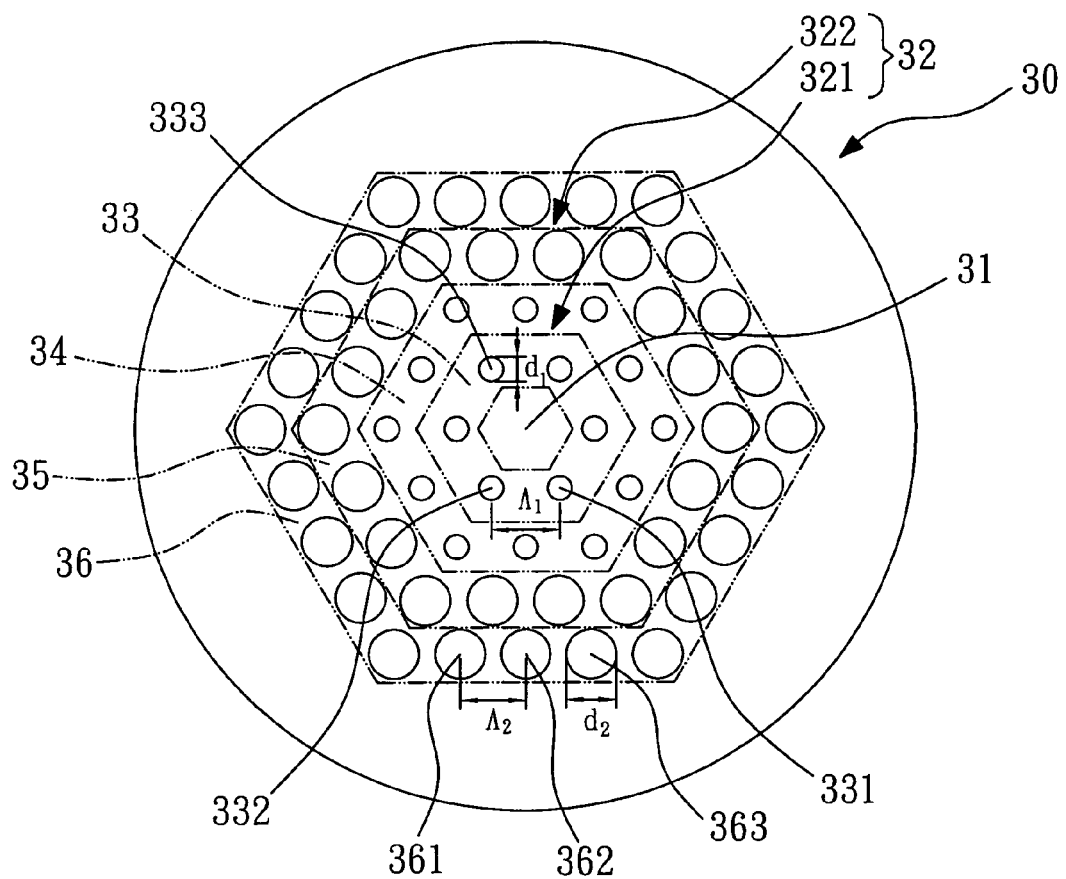
FIG. 3 shows a schematic cross-sectional view of a micro-structured fiber according to a preferred embodiment of the present invention.

FIG. 3 shows a schematic cross-sectional view of a micro-structured fiber according to a preferred embodiment of the present invention. The micro-structured fiber 30 comprises a core region 31 and a cladding region 32, wherein the core region 31 and the cladding region 32 have the same material, such as silica. The cladding region 32 has a plurality of air holes 331, 332, 333 that are regularly arranged on a plurality of hexagonal rings 33, 34, 35, 36, wherein the innermost ring 33 of the fiber 30 defines the core region 31. That is, in the present invention, the regularly arrayed air holes 331, 332, 333 in the innermost ring 33 surround the central portion of the silica fiber 30 to form the core region 31. Therefore, the core region 31 of the fiber 30 of the present invention has no air hole. The region that has a plurality of regularly arrayed air holes is the cladding region 32. In this embodiment, the rings are equilateral hexagons from top view.

The characteristic of the present invention is that the cladding region 32 comprises an inner circumference portion 321 and an outer circumference portion 322, the inner circumference portion 321 comprises at least two rings, and the outer circumference portion 322 comprises at least one ring. The inner circumference portion 321 and the outer circumference portion 322 are adjacent to one another. In the embodiment, the inner circumference portion 321 comprises two rings 33, 34, the outer circumference portion 322 comprises two rings 35, 36. There are four rings in total in the fiber 30. It is understood that the present invention is not limited to four rings, the inner circumference portion 321 may comprise two to six rings, and the outer circumference portion 322 may comprise one to six rings.

Taking ring 33 for example, all the air holes 331, 332, 333 on the ring 33 of the inner circumference portion 321 have equal first diameters $d_1$, and all first pitches $\Lambda_1$ between the air holes 331, 332 on the ring 33 are equal. Taking ring 36 for example, all the air holes 361, 362, 363 on the ring 36 of the outer circumference portion 322 have equal second diameters $d_2$, and all second pitches $\Lambda_2$ between the air holes 361, 362 on the ring 36 are equal. In this embodiment, the second diameter $d_2$ of the air holes 363 on the outer circumference portion 322 is larger than the first diameter $d_1$ of the air holes 333 on the inner circumference portion 321. Additionally, the second pitch $\Lambda_2$ between the air holes 361, 362 on the ring 36 of the outer circumference 322 is equal to the first pitch $\Lambda_1$ between the air holes 331, 332 on the ring 33 of the inner circumference 321. Alternatively, the second pitch $\Lambda_2$ may be larger or small than the first pitch $\Lambda_1$.

Figure 1:
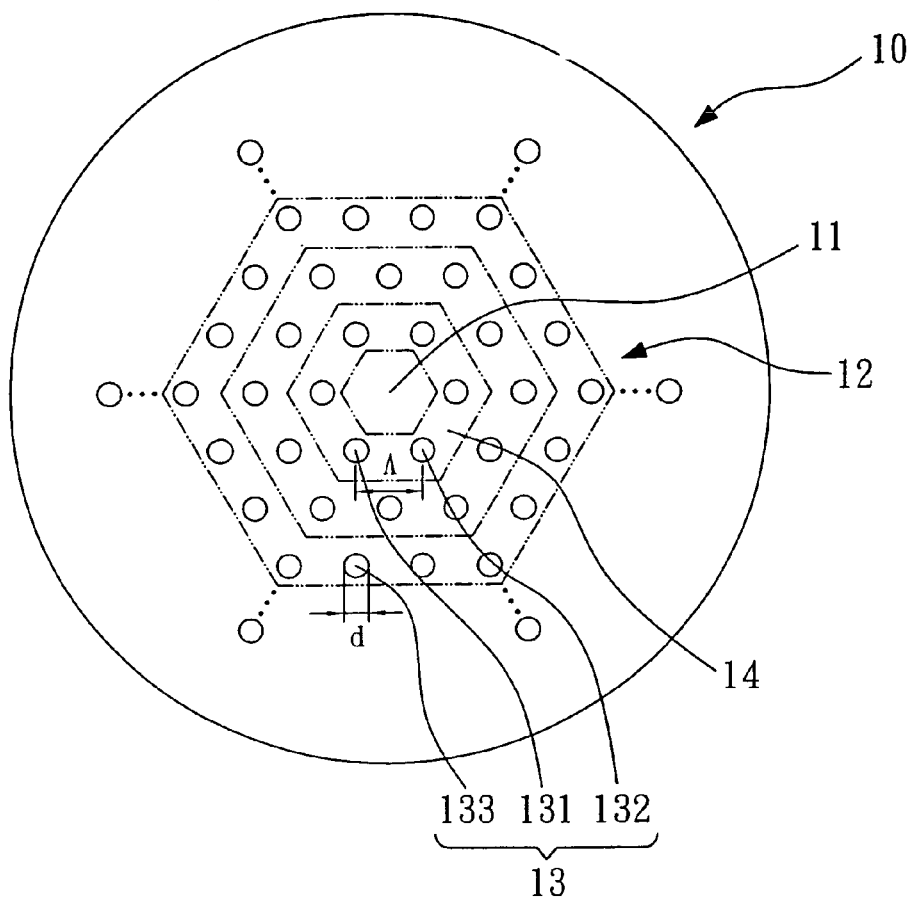
FIG. 1 shows a schematic cross-sectional view of a conventional micro-structured fiber.
Figure 2:
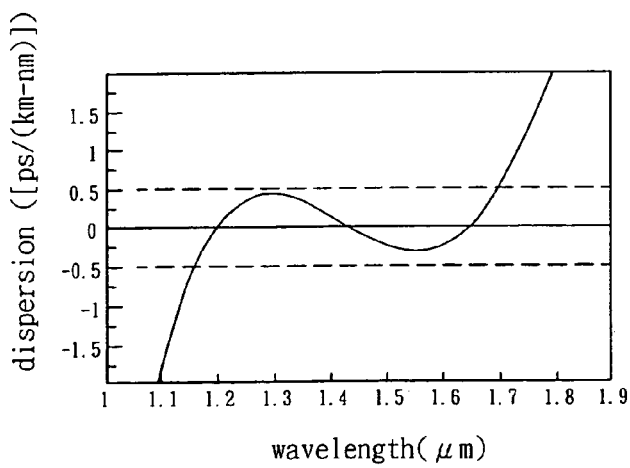
FIG. 2 shows a relationship between the chromatic dispersion value and the wavelength of a conventional micro-structured fiber.

The advantage of the present invention is that when being designed for the consideration of flattened dispersion, the micro-structured fiber 30 has the following geometrical parameters: first diameter $d_1$ and first pitch $\Lambda_1$ of the inner circumference portion 321, second diameter $d_2$ and second pitch $\Lambda_2$ of the outer circumference portion 322. Compared with the conventional micro-structured fiber 10 of FIG. 1, the second diameter $d_2$ of the micro-structured fiber 30 of the present invention is larger than the first diameter $d_1$, so that the confinement loss can be reduced significantly, and the amount of the ring is not necessarily up to twenty. Compared with the conventional micro-structured fiber of the above-mentioned second prior art, the micro-structured fiber 30 of the present invention has only four geometrical parameters (if $\Lambda_1$ is equal to $\Lambda_2$, the amount of geometrical parameters can be reduced to three), so that the micro-structured fiber 30 can be more efficiently designed and optimized to achieve the characteristic of broadband ultra-flattened dispersion. Additionally, the micro-structured fiber 30 of the present invention consists of only two different sizes of air holes ($d_1$ and $d_2$), which makes the micro-structured fiber 30 easy to be fabricated.

The procedures for designing the micro-structured fiber 30 of the present invention are as follows. First, the ratio of $d_2/\Lambda_2$ is chosen from the range of 0.5 to 0.99 under the consideration of confinement loss. It is found that larger ratio of $d_2/\Lambda_2$ will cause less confinement loss. Then, $d_1/\Lambda_1$, $\Lambda_1$ and $\Lambda_2/\Lambda_1$ are adjusted in sequence to get the desired flattened dispersion property, wherein the ratio of $d_1/\Lambda_1$ will influence the slope behavior of the chromatic dispersion curves, the value of $\Lambda_2/\Lambda_1$ will influence the size of bandwidth. The ratio of $d_1/\Lambda_1$ is within the range of 0.2 to 0.4.

Figure 4:
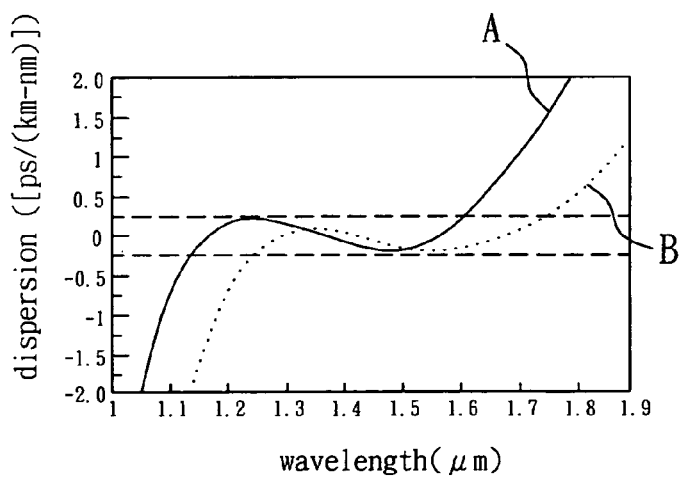
FIG. 4 shows a relationship between the chromatic dispersion value and the wavelength of the micro-structured fiber according to the present invention.

FIG. 4 shows a relationship between the chromatic dispersion value and the wavelength of the micro-structured fiber according to the present invention. The micro-structured fiber represented by curve A comprises three rings, wherein the inner circumference portion comprises two rings, and the outer circumference portion comprises one ring. The geometrical parameters of $\Lambda_1$, $d_1$, $\Lambda_2$ and $d_2$ of the fiber are determined to be 1.43 μm, 0.51072 μm, 1.428 μm and 1.2852 μm, respectively. The fiber has a dispersion of ±0.5 ps/km/nm from 1140 nm to 1590 nm wavelength, which has a bandwidth of 450 nm.

The micro-structured fiber represented by curve B comprises four rings, wherein the inner circumference portion comprises two rings, and the outer circumference portion comprises two rings. The geometrical parameters of $\Lambda_1$, $d_1$, $\Lambda_2$ and $d_2$ of the fiber are determined to be 1.68 μm, 0.51072 μm, 1.428 μm and 1.2852 μm, respectively. The fiber has a dispersion of ±0.5 ps/km/nm from 1245 nm to 1740 nm wavelength, which has a bandwidth of 495 nm covering total band of light communication.

While several embodiments of the present invention have been illustrated and described, various modifications and improvements can be made by those skilled in the art. The embodiments of the present invention are therefore described in an illustrative but not restrictive sense. It is intended that the present invention may not be limited to the particular forms as illustrated, and that all modifications which maintain the spirit and scope of the present invention are within the scope as defined in the appended claims.

What is claimed is:

1. A micro-structured fiber comprising a core region and a cladding region, wherein the materials of the core region and the cladding region are silica, and the cladding region has a plurality of air holes regularly arranged on a plurality of rings, wherein an innermost ring of the fiber defines the core region, wherein the cladding region comprises an inner circumference portion and an outer circumference portion, the inner circumference portion and the outer circumference portion are adjacent one another, the inner circumference portion comprising at least two rings, wherein the air holes on each ring of the inner circumference portion have equal first diameters and first pitches therebetween respectively, the outer circumference portion comprising at least one ring, wherein the air holes on each ring of the outer circumference portion have equal second diameters and second pitches therebetween respectively, wherein the second diameter of the air hole on the outer circumference portion is larger than the first diameter of the air hole on the inner circumference portion, wherein a ratio of the first diameter to the first pitch of the air holes on the inner circumference portion is in the range of 0.2 to 0.4, and a ratio of the second diameter to the second pitch of the air holes on the outer circumference portion is in the range of 0.5 to 0.99, wherein the fiber has a flattened dispersion of ±0.5 ps/km/nm with a bandwidth in the range of 40 to 600 nm.

2. The micro-structured fiber according to claim 1, wherein the second pitch between the air holes on the ring of the outer circumference is larger than the first pitch between the air holes on the ring of the inner circumference.

3. The micro-structured fiber according to claim 1, wherein the second pitch between the air holes on the ring of the outer circumference is smaller than the first pitch between the air holes on the ring of the inner circumference.

4. The micro-structured fiber according to claim 1, wherein the second pitch between the air holes on the ring of the outer circumference is equal to the first pitch between the air holes on the ring of the inner circumference.

5. The micro-structured fiber according to claim 1, wherein the inner circumference portion comprises 2 to 6 rings.

6. The micro-structured fiber according to claim 1, wherein the outer circumference portion comprises 1 to 6 rings.

7. The micro-structured fiber according to claim 1, wherein the rings are hexagonal.

\* \* \* \* \*